US 9,864,955 B2

(12) United States Patent
Faaborg et al.

(10) Patent No.: US 9,864,955 B2
(45) Date of Patent: *Jan. 9, 2018

(54) PERFORMING AN OPERATION DURING INFERRED PERIODS OF NON-USE OF A WEARABLE DEVICE

(71) Applicant: Google Inc., Mountain View, CA (US)

(72) Inventors: Alexander Faaborg, Mountain View, CA (US); Jeffrey Albert Chang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,130

(22) Filed: Feb. 20, 2017

(65) Prior Publication Data
US 2017/0161642 A1  Jun. 8, 2017

Related U.S. Application Data

(63) Continuation of application No. 14/313,835, filed on Jun. 24, 2014, now Pat. No. 9,612,862.

(51) Int. Cl.
| | | |
|---|---|---|
| *G06F 9/46* | (2006.01) | |
| *G06N 99/00* | (2010.01) | |
| *G06N 5/04* | (2006.01) | |
| *G06F 1/16* | (2006.01) | |

(52) U.S. Cl.
CPC ............ *G06N 99/005* (2013.01); *G06N 5/04* (2013.01); *G06F 1/163* (2013.01)

(58) Field of Classification Search
CPC ......... G06N 99/005; G06N 5/04; G06F 1/163
See application file for complete search history.

(56) References Cited

U.S. PATENT DOCUMENTS

| | | |
|---|---|---|
| 6,937,225 B1 | 8/2005 | Kehlstadt et al. |
| 8,031,074 B2 | 10/2011 | Lizza |
| 8,289,162 B2 | 10/2012 | Mooring et al. |
| 2005/0177282 A1 | 8/2005 | Mason, II |
| 2006/0026212 A1 | 2/2006 | Tsukerman et al. |
| 2006/0101400 A1 | 5/2006 | Capek et al. |

(Continued)

FOREIGN PATENT DOCUMENTS

| | | |
|---|---|---|
| WO | 2004008781 A2 | 1/2004 |
| WO | 2007149731 A1 | 12/2007 |

(Continued)

OTHER PUBLICATIONS

International Search Report and Written Opinion of International Application No. PCT/US2015/033789, dated Sep. 28, 2015, 11 pp.

(Continued)

*Primary Examiner* — James J Lee
(74) *Attorney, Agent, or Firm* — Shumaker & Sieffert, P.A.

(57) ABSTRACT

A wearable computing device is described that predicts, based on movement detected, over time, by the wearable computing device, one or more future periods of time during which the wearable computing device will not be used. Responsive to determining that the wearable computing device is not being used at a current time, the wearable computing device determines whether the current time coincides with at least one period of time from the one or more future periods of time. Responsive to determining that the current time coincides with the at least one period of time, the wearable computing device performs an operation.

20 Claims, 5 Drawing Sheets

(56) References Cited

U.S. PATENT DOCUMENTS

| | | |
|---|---|---|
| 2010/0052930 A1 | 3/2010 | Grigsby et al. |
| 2010/0123436 A1 | 5/2010 | Herrod et al. |
| 2013/0194066 A1 | 8/2013 | Rahman et al. |
| 2013/0217978 A1 | 8/2013 | Ma |
| 2014/0052681 A1 | 2/2014 | Nitz et al. |
| 2014/0075008 A1 | 3/2014 | Douglas et al. |
| 2014/0082384 A1 | 3/2014 | De Cesare et al. |
| 2014/0099614 A1 | 4/2014 | Hu et al. |
| 2014/0111418 A1 | 4/2014 | Lee et al. |
| 2014/0136451 A1 | 5/2014 | Marti et al. |
| 2014/0171146 A1 | 6/2014 | Ma et al. |
| 2014/0172873 A1 | 6/2014 | Varoglu et al. |
| 2015/0161885 A1 | 6/2015 | Wang et al. |
| 2015/0279168 A1 | 10/2015 | Avrahami |
| 2015/0370597 A1 | 12/2015 | Faaborg et al. |
| 2016/0299570 A1 | 10/2016 | Davydov |

FOREIGN PATENT DOCUMENTS

| | | |
|---|---|---|
| WO | 2012061438 A2 | 5/2012 |
| WO | 2014143814 A1 | 9/2014 |

OTHER PUBLICATIONS

International Preliminary Report on Patentability from International Application No. PCT/US2015/033789, dated Jan. 5, 2017 9 pgs.

Prosecution History from U.S. Appl. No. 14/313,835, from Sep. 25, 2014 through Feb. 8, 2017 93 pgs.

PERFORMING AN OPERATION DURING INFERRED PERIODS OF NON-USE OF A WEARABLE DEVICE

This application is a Continuation of U.S. application Ser. No. 14/313,835, filed Jun. 24, 2014, the entire content of which is hereby incorporated by reference.

BACKGROUND

A computing device (e.g., a mobile device, a wearable computing device, a desktop computer, etc.) may perform various scheduled and unscheduled system tasks that, at times, may require the computing device to temporarily disable one or more features and/or restrict access to certain functionality of the computing device. For example, during installation of a software and/or firmware update, the computing device may prevent a user from interacting with some, if not all, applications, services, processes, and/or features of the computing device that could potentially interfere with the update. As some computing tasks are relatively complex and may require a computing device to take a relatively lengthy time to complete, the computing device may render certain features or functionality of the computing device inaccessible for an extended period of time while such a task is being performed. A user may be inconvenienced by the performance of complex tasks if execution of such tasks occurs at a time when he or she wishes to interact with the computing device.

SUMMARY

In one example, the disclosure is directed to a method that includes predicting, based on movements of a wearable computing device, over time, one or more future periods of time during which the wearable computing device will not be used. The method further includes responsive to determining that the wearable computing device is not being used at a current time, determining whether the current time coincides with at least one period of time from the one or more future periods of time. The method further includes responsive to determining that the current time coincides with the at least one period of time, performing, by the wearable computing device, an operation.

In another example, the disclosure is directed to a wearable computing device that includes at least one motion sensor, at least one module, and at least one processor operable by the at least one processor to predict, based on movements detected, over time, by the at least one motion sensor, one or more future periods of time during which the wearable computing device will not be used. The at least one module is further operable by the at least one processor to responsive to determining that the wearable computing device is not being used at a current time, determine whether the current time coincides with at least one period of time from the one or more future periods of time, and responsive to determining that the current time coincides with the at least one period of time, perform an operation.

In another example, the disclosure is directed to a method that includes obtaining, by a computing system, an indication of one or more movements detected by a wearable computing device on a plurality of prior days, and identifying, by the computing system, based on the one or more movements, a recurring period of time during which a frequency of movement or a magnitude of change associated with at least one movement from the one or more movements satisfies a threshold for indicating that the wearable computing device is not being used. The method further includes determining, by the computing system, based on the recurring period of time, a period of time of a future day when the wearable computing device will not be used, wherein the period of time of the future day corresponds to the recurring period of time of the plurality of days, and responsive to determining that a current time coincides with the period of time of the future day, invoking, by the computing system, at the wearable computing device, an operation.

The details of one or more examples are set forth in the accompanying drawings and the description below. Other features, objects, and advantages of the disclosure will be apparent from the description and drawings, and from the claims.

DETAILED DESCRIPTION

Figure 1:
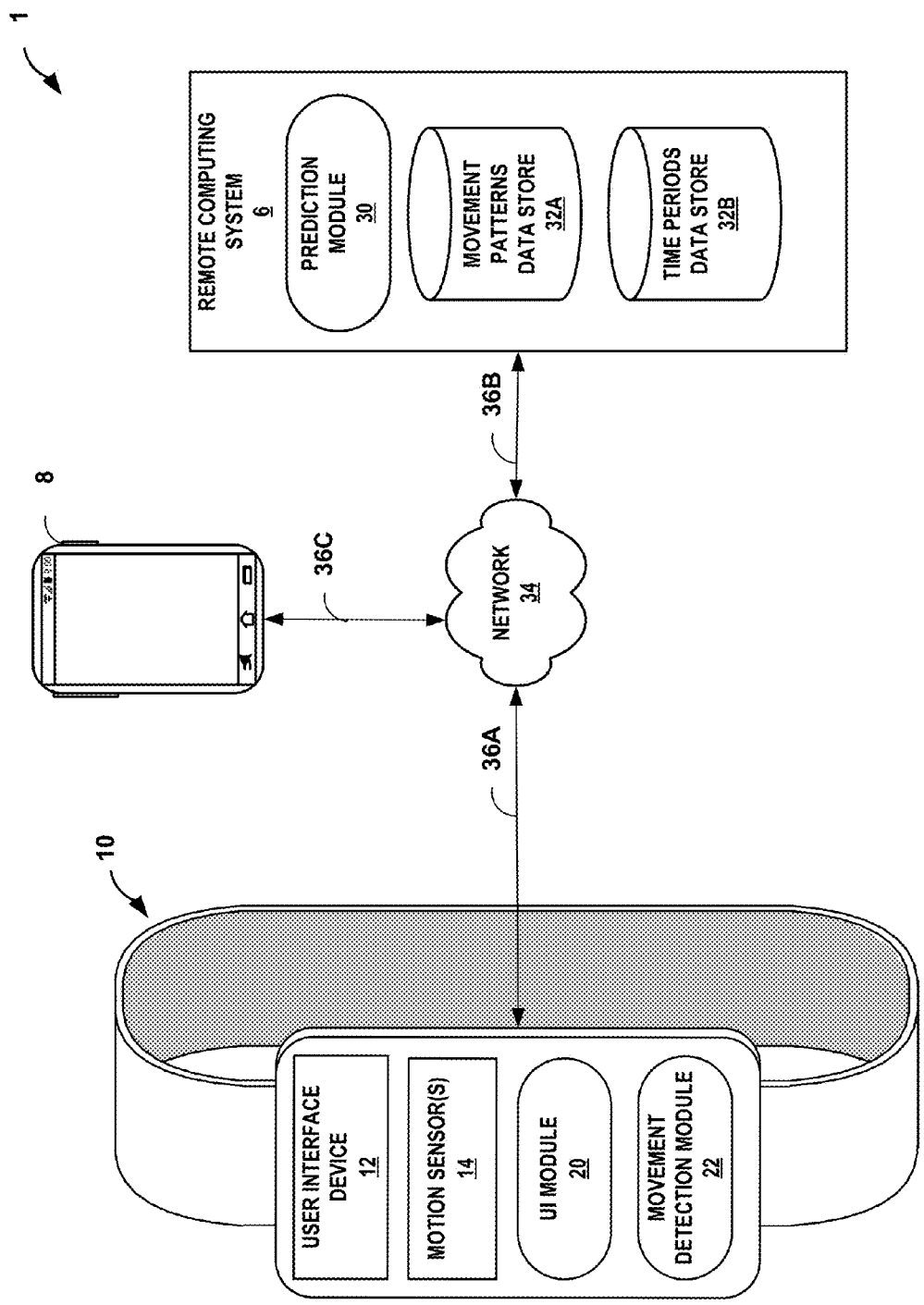
FIG. 1 is a conceptual diagram illustrating an example computing system configured to determine when a user will not be interacting with a wearable computing device, in accordance with one or more aspects of the present disclosure.

In general, techniques of this disclosure may enable a wearable computing device (e.g., a computerized watch, computerized eyewear, computerized audio headphones, etc.) to only perform certain operations during time periods in which a user is predicted to not be using or otherwise interacting with the wearable computing device. A computing system (e.g., a server, a mobile phone, etc.) may communicate with a wearable computing device (e.g., a watch) via a network. In some implementations, the wearable computing device may, over time, detect movements (e.g., accelerations, changes in tilt, etc.) and may provide information about the detected movements (e.g., as movement data) to the computing system via the network. In some implementations, the computing system and/or wearable computing device may identify patterns in the movement data and determine one or more recurring periods of time and/or times of day during which the wearable computing device typically is moved less than a threshold amount. For example, the computing system may determine that the wearable computing device typically is not moved for several hours during each night of the week (e.g., because a user has removed the wearable computing device, and, e.g., set the wearable computing device on a dresser or nightstand while sleeping).

In some implementations, the computing system may infer that the above-described recurring periods of time during which the wearable computing device is moved less than a threshold a mount, are time periods during which the user will not likely interact with the wearable computing device. Hence, the computing system may determine that these recurring periods of time coincide with future periods of time during which certain operations can be performed without interfering the user's ability to interact with the wearable computing device. As such, in some implementations, the computing system may invoke, or wearable computing device may initiate performance of, an operation (e.g., deactivating a display, installing a software package, disabling an alert feature, and/or presenting a security challenge graphical user interface) when a current time coincides with or falls within one of the recurring periods of time.

In this manner, unlike some computing devices that may prevent a user from interacting with most, if not all, applications, services, processes, and/or features of a computing device while performing certain operations, the wearable computing device according to techniques of the disclosure may selectively perform certain tasks during time periods in which the wearable computing device is likely not being used. In this way, the wearable computing device may maximize the amount of interaction time available to a user of the wearable computing device while also completing needed operations.

Throughout the disclosure, examples are described where a computing system (e.g., a server, etc.) and/or computing device (e.g., a wearable computing device, etc.) may analyze information (e.g., locations, speeds, accelerations, orientations, etc.) associated with the computing system and/or computing device, only if the computing system and/or computing device receives permission from a user (e.g., a person wearing a wearable computing device) to analyze the information. For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's e-mail, a user's social network, social actions or activities, profession, a user's preferences, or a user's past and current location), or to dictate whether and/or how to the computing system and/or computing device may receive content that may be relevant to the user. In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

FIG. 1 is a conceptual diagram illustrating an example computing system configured to determine when a user will not be interacting with a wearable computing device, in accordance with one or more aspects of the present disclosure. System 1 includes wearable computing device 10, mobile computing device 8, remote computing system 6, and network 34. System 1 may determine that wearable computing device 10 is not being used, and in response, determine whether wearable computing device 10 will likely finish executing an operation before wearable computing device 10 is used again.

Network 34 represents any public or private communication network. Wearable computing device 10, mobile computing device 8, and remote computing system 6 may send and receive data across network 34 using any suitable communication techniques. For example, wearable computing device 10 may be operatively coupled to network 34 using network link 36A. Remote computing system 6 may be operatively coupled to network 34 by network link 36B and mobile computing device 8 may be operatively coupled to network 34 using network link 36C.

Network 34 may include network hubs, network switches, network routers, etc., that are operatively inter-coupled thereby providing for the exchange of information between wearable computing device 10, mobile computing device 8, and remote computing system 6. In some examples, network links 36A, 36B, and 36C may be Ethernet, ATM or other network connections. Such connections may be wireless and/or wired connections.

In the example of FIG. 1, mobile computing device 8 is a mobile phone and wearable computing device 10 is a watch. However other examples of mobile computing device 8 and wearable computing device 10 exist.

Wearable computing device 10 may be any type of computing device, which can be worn, held, or otherwise physically attached to a person, and which includes one or more processors configured to process and analyze indications of movement (e.g., sensor data) of the wearable computing device. Examples of wearable computing device 10 include, but are not limited to, a watch, computerized eyewear, a computerized headset, a computerized glove, computerized jewelry, or any other combination of hardware, software, and/or firmware that can be used to detect movement of a person who is wearing, holding, or otherwise being attached to wearable computing device 10.

Mobile computing device 8 may be any mobile computing device that includes one or more processors configured to perform operations related to detecting, analyzing, and or outputting indications (e.g., data) of movement obtained by a wearable computing device. Numerous examples of mobile computing device 8 exist and include, but are not limited to, a mobile phone, a tablet computer, a personal digital assistant (PDA), a laptop computer, a portable gaming device, a portable media player, an e-book reader, a wearable computing device, or any other combination of hardware, software, and/or firmware.

Although shown in FIG. 1 as a separate element apart from remote computing system 6, in some examples, mobile computing device 8 may be a remote computing system including functionality of prediction module 30 for providing a probability that a wearable computing device is being used. In other words, although not shown, prediction module 30 and movement patterns data store 32 may exist locally at mobile computing device 8 and/or may exist locally at wearable computing device 10, to receive information comprising an indication of movement from wearable computing device 10, determine a probability, based on the indication of movement, that wearable computing device 10 is or is not being used, and output, for transmission to wearable computing device 10, the probability.

In any event, as shown in FIG. 1, wearable computing device 10 includes a user interface device (UID) 12. UID 12 of wearable computing device 10 may function as an input device for wearable computing device 10 and as an output device. UID 12 may be implemented using various technologies. For instance, UID 12 may function as an input device using a microphone and as an output device using a speaker to provide an audio based user interface. UID 12 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of wearable computing device 10.

UID 12 of wearable computing device 10 may include a presence-sensitive display that may receive tactile input from a user of wearable computing device 10. UID 12 may receive indications of the tactile input by detecting one or more gestures from a user of wearable computing device 10 (e.g., the user touching or pointing to one or more locations of UID 12 with a finger or a stylus pen). UID 12 may present output to a user, for instance at a presence-sensitive display. UID 12 may present the output as a graphical user interface which may be associated with functionality provided by wearable computing device 10. For example, UID 12 may present various user interfaces of applications executing at or accessible by wearable computing device 10 (e.g., an electronic message application, a navigation application, an Internet browser application, etc.). A user may interact with a respective user interface of an application to cause wearable computing device 10 to perform operations relating to a function.

FIG. 1 shows an example wearable computing device 10 that includes one or more motion sensors 14 for detecting movement associated with wearable computing device 10 and capturing the detected movements as motion data that motion sensors 14 provide to other components of wearable computing device 10. Many examples of motion sensors 14 exist including microphones, cameras, accelerometers, gyroscopes, thermometers, pressure sensors, barometers, ambient light sensors, altimeters, and the like. One or more sensors 14 may capture motion data and output the captured motion data to one or more components of wearable computing device 10, such as modules 20 and 22.

Wearable computing device 10 may include user interface ("UI") module 20 and movement detection module 22. Modules 20 and 22 may perform operations described using software, hardware, firmware, or a mixture of hardware, software, and firmware residing in and/or executing at wearable computing device 10. Wearable computing device 10 may execute modules 20 and 22 with multiple processors. Wearable computing device 10 may execute modules 20 and 22 as a virtual machine executing on underlying hardware. Modules 20 and 22 may execute as one or more services of an operating system, a computing platform. Modules 20 and 22 may execute as one or more remote computing services, such as one or more services provided by a cloud and/or cluster based computing system. Modules 20 and 22 may execute as one or more executable programs at an application layer of a computing platform.

Movement detection module 22 may obtain motion data captured by motion sensors 14, and based on the motion data, determine whether wearable computing device 10 is being used. In some examples, movement detection module 22 may determine whether wearable computing device 10 is being used in real-time. In some examples, movement detection module 22 may rely on motion data obtained prior to a current time to determine whether wearable computing device 10 is being used.

For example, movement detection module 22 may analyze acceleration data obtained from one of motion sensors 14 (e.g., an accelerometer), and determine that if the acceleration data indicates that the acceleration of wearable computing device 10 has changed with enough frequency and/or magnitude, to indicate that a user is interacting with or using wearable computing device 10. Conversely, when motion data includes insufficient changes in the frequency and/or magnitude of the acceleration of wearable computing device 10, movement detection module 22 may infer that the user is not interacting or otherwise using wearable computing device 10. Movement detection module 22 may rely on machine learning or other type of rules based, artificial intelligence techniques to determine when motion data obtained from motion sensors 14 indicates that wearable computing device 10 is being used.

Movement detection module 22 may output information to UI module 20 indicating whether wearable computing device 10 is being used at a current time. Movement detection module 22 may provide indications of movement (e.g., data) based on motion data obtained from motion sensors 14 to remote computing system 6 and/or mobile computing device 8 in exchange for an indication of whether or not wearable computing device 10 is being used at a current time. Remote computing system 6 and/or mobile computing device 8 may use the indications of movement obtained from movement detection module 22 to not only determine whether wearable computing device 10 is being used, but also to generate a database of movement patterns of wearable computing device 10 (e.g., stored at movement patterns data store 32A) which remote computing system 6 and/or mobile computing device 8 may use and access to predict one or more future periods of time when wearable computing device 10 will not be used.

UI module 20 may function as a main control module of wearable computing device 10 by not only providing user interface functionality associated with wearable computing device 10, but also by acting as an intermediary between other modules (e.g., module 22) of wearable computing device 10 and other components (e.g., UID 12, motion sensors 14), as well as device 10 and system 6 of network 34. By acting as an intermediary or control module on behalf of wearable computing device 10, UI module 20 may ensure that wearable computing device 10 provides stable, and expected functionality to a user. UI module 20 may rely on machine learning or other type of rules based, artificial intelligence techniques to control how wearable computing device 10 operates.

UI module 20 may cause UID 12 to present a user interface and cause wearable computing device 10 to perform one or more functions in response to input in connection with the user interface, detected by wearable computing device 10. In addition, UI module 20 may obtain network information (e.g., software updates, communications, etc.) that UI module 20 processes on behalf of wearable computing device 10.

For instance, UI module 20 may receive a notification from an administrator on network 34 indicating that a software package update associated with an application executing at wearable computing device 10 and/or an operating system or platform update associated with an operating system or platform executing at wearable computing device 10, are ready for installation. UI module 20 may manage the downloading of the updates associated with the application, operating system, and/or platform, and execute the installation associated with the updates associated with the application, operating system, and/or platform on behalf of wearable computing device 10.

UI module 20 may cause UID 12 to present audio (e.g., sounds), graphics, or other types of output (e.g., haptic feedback, etc.) associated with a user interface that a person may use to interact with features and/or functions of wearable computing device 10. Conversely, UI module 20 may at times cause UID 12 to refrain from outputting audible, visual, or other types of alerts, for example, when UI module 20 infers that wearable computing device 10 is not being used.

UI module 20 may receive information via network 34 from prediction module 30 that causes UI module 20 to alter or otherwise change, the presentation of a user interface at UID 12. For instance, when movement detection module 22 determines that wearable computing device 10 is not being used, UI module 20 may determine that the current time coincides with a predicted, period of time during which wearable computing device 10 will not be used. Responsive to determining that wearable computing device 10 can complete execution of a particular operation (e.g., install a software package, updating an operating system or platform, or perform some other operation) during the period of non-use, UI module 20 may deactivate or disable UID 12 to prevent wearable computing device 10 from disturbing the user and/or preventing the user from interrupting wearable computing device 10 while wearable computing device 10 executes the operation.

To control operations of wearable computing device 10, UI module 20 may rely on information obtained from movement detection module 22 and/or information received via network 34 (e.g., from mobile computing device 8 and/or remote computing system 6) that indicates whether wearable computing device 10 is being used. UI module 20 may control wearable computing device 10 by further relying on information obtained network 34 that indicates for how long prediction module 30 predicts that wearable computing device 10 will not be used. UI module 20 may cause wearable computing device 10 to perform certain operations when UI module 20 receives information indicating that wearable computing device 10 is not being used and will not be used again until a future time.

For example, before initiating the installation of a software update, UI module 20 may determine whether wearable computing device 10 is being used and/or whether the installation can be performed without interfering with a user's interactions with wearable computing device 10. UI module 20 may delay the installation until UI module 20 receives an indication that wearable computing device 10 is not being used and that the installation will finish before wearable computing device 10 will be used again.

In some examples, UI module 20 may include features and or capabilities of prediction module 30, movement patterns data store 32A, and/or time periods data store 32B, which are described in greater detail below. In general, UI module 20 may rely on identified, recurring patterns of movement to determine when a current time coincides with a predicted, future period of time during which wearable computing device 10 will not be used to determine which operations to cause wearable computing device 10 to perform at the current time without interfering with a user's interaction with wearable computing device 10.

Remote computing system 6 of system 1 represents any suitable mobile or stationary remote computing system, such as one or more desktop computers, laptop computers, mainframes, servers, cloud computing systems, etc. capable of sending and receiving information across network link 36B to network 34. In some examples, remote computing system 6 represents a cloud computing system that provides one or more services through network 34. One or more computing devices, such as wearable computing device 10 and mobile computing device 8, may access the one or more services provided by the cloud using remote computing system 6. For example, wearable computing device 10 and/or mobile computing device 8 may store and/or access data in the cloud using remote computing system 6. In some examples, some or all the functionality of remote computing system 6 exists in a mobile computing platform, such as mobile computing device 8 and/or wearable computing device 10. Said differently, the features and functionality associated with remote computing system 6 may execute as an underlying component of wearable computing device 10 and/or mobile computing device 8.

Remote computing system 6 includes prediction module 30, movement patterns data store 32A, and time periods data store 32B. Prediction module 30 may perform operations described herein using software, hardware, firmware, or a mixture of hardware, software, and firmware residing in and/or executing at remote computing system 6. Remote computing system 6 may execute prediction module 30 with multiple processors or multiple devices. Remote computing system 6 may execute prediction module 30 as a virtual machine executing on underlying hardware. Prediction module 30 may execute as a service of an operating system or computing platform. Prediction module 30 may execute as one or more executable programs at an application layer of a computing platform. Prediction module 30 may rely on machine learning or other type of rules based, artificial intelligence techniques to control how wearable computing device 10 operates.

Movement patterns data store 32A represents any suitable storage medium for storing actual, modeled, predicted, or otherwise derived patterns of movement (based on motion sensor data obtained from a wearable computing device) of a wearable computing device connected to network 34, such as wearable computing device 10. A machine learning system (or other type of predictive or artificial intelligence type model) of prediction module 30, may generate and access the patterns of movement stored at data store 32A to later infer, predict, or otherwise determine future periods of time when wearable computing device will or will not be used.

Data store 32A may likewise store actual, time stamped, movement or motion data obtained from a wearable computing device, such as wearable computing device 10. The time stamp of the movement data may indicate when (e.g., time of day, calendar day, year, etc.) a corresponding movement was detected by the wearable computing device. For instance, a portion of the data stored at data store 32A may include one or more tables that have motion sensor readings, taken over a period of time, along with the times when the readings were taken.

Time periods data store 32B represents any suitable storage medium for storing time data (e.g., indications of time) that specify future periods of time when prediction module 30 predicts that a wearable computing device will or will not be used. Each period of time may include a start time, a stop time, an approximate duration, or any other portion of information that UI module 20 and/or prediction module 30 may use to determine whether wearable computing device 10 is capable of finishing an operation during the respective period of time.

Data stores 32A and 32B may contain lookup tables, databases, charts, graphs, functions, equations, and the like that prediction module 30 may access to generate one or more rules for determine when wearable computing device 10 is being used, as well as rules for determining periods during which wearable computing device 10 will not be used and/or rules for determining whether wearable computing device 10 can finish performing an operation during a future period of time when wearable computing device 10 is not in use. Remote computing system 6 may provide access to the data stored at data stores 32A and 32B as a cloud based service to devices connected to network 34, such as wearable computing device 10 and/or mobile computing device 8. Wearable computing device 10 and/or mobile computing device 8 may access the data stored at data stores 32A and 32B to perform techniques for predicting when and if a user of wearable computing device 10 is interacting with or otherwise using computing device 10.

Prediction module 30 may respond to requests, from wearable computing device 10 and/or mobile computing device 8, for information that indicates whether a user of wearable computing device 10 is interacting with, or in any way, using (e.g., viewing graphical content with, listening to audio output from, etc.) wearable computing device 10 at a current time. Prediction module 30 may respond to requests for information indicating whether wearable computing device 10 can complete execution of an operation prior to the next time that a user is predicted to interact with wearable computing device 10.

Prediction module 30 may rely on the rules generated from the information contained at data stores 32A and 32B to determine whether movement data obtained from one or more motion sensors 14 of wearable computing device 10 indicates that a user is, or is not, interacting with wearable computing device 10 and if not, whether to invoke the execution of an operation at wearable computing device 10. Prediction module 30 may access the time data stored at data store 32B to infer, predict, determine or allow UI module 20 to infer, predict, or determine whether wearable computing device 10 can complete execution of an operation during a period of time that coincides with a current time. UI module 20 may cause wearable computing device 10 to perform an operation if prediction module 30 provides information to UI module 20 that indicates that wearable computing device 10 will not be used for a sufficient duration of time that allows wearable computing device 10 to complete execution of the operation without interfering with a user's access to wearable computing device 10.

Prediction module 30 may receive a request from motion detection module 22 of wearable computing device 10 via network link 36B for a probability indicating whether a person is, or is not wearing wearable computing device 10 at a current time. At the time of the request, prediction module 30 may receive motion sensor data from wearable computing device 10 and compare the received motion sensor data to one or more patterns of movement stored at data store 32A to derive a probability that the person is or is not wearing wearable computing device 10. For example, if a portion of the motion sensor data matches or corresponds to a pattern of movement typically obtained when a user is not using wearable computing device 10, prediction module 30 may determine that a high probability (e.g., greater than zero percent) exists that wearable computing device 10 is not being used. In response to the request from motion detection module 22, prediction module 30 may output an indication of the probability that the user of wearable computing device 10 is or is not using wearable computing device 10.

Prediction module 30 may respond to requests for information indicating whether wearable computing device 10 can complete execution of an operation prior to the next time that a user is predicted to interact with wearable computing device 10. For example, prediction module 30 may receive a request from UI module 20 for a probability indicating whether an operation can be performed by wearable computing device 10 during a current time period when the person is not using wearable computing device 10. Prediction module 30 may receive an identifier of the operation, or at least an estimated duration of time for wearable computing device 10 to perform the operation. Prediction module 30 may lookup a current time associated with wearable computing device 10 at data store 32B to identify any stored periods of time coincide with the current time. Prediction module 30 may determine whether any periods of time stored at data store 32B, that coincide with the current time, will last long enough to allow wearable computing device 10 to begin, and complete execution of the operation at the current time. In other words, prediction module 30 may infer whether an operation can be completed while wearable computing device 10 is not being used. In response to the request from UI module 20, prediction module 30 may output an indication of the probability that wearable computing device 10 can complete execution of the operation prior to the end of the recurring period of time.

In accordance with techniques of this disclosure, prediction module 30 may predict, based on a plurality of movements detected by wearable computing device 10, one or more future periods of time during which the wearable computing device will not be used. For example, before a user of wearable computing device 10 goes to sleep, he or she may detach wearable computing device 10 from his or her body and place wearable computing device 10 on a nightstand. While the user sleeps, wearable computing device 10 may remain, mostly untouched, until the user awakes and re-attaches wearable computing device 10 to his or her body. The user may repeat these patterns of movement (e.g., detaching wearable computing device 10, placing wearable computing device 10 on the night stand, and re-attaching wearable computing device 10) at approximately the same time of day, over a period of two or more calendar days.

Prediction module 30 may obtain an indication of the plurality of movements detected by wearable computing device 10 over the period of two or more calendar days. Prediction module 30 may identify one or more recurring patterns of movement in the plurality of movements. For example, a machine learning system or other rules based, artificial intelligence system of prediction module 30 may determine that on two or more calendar days, between the hours of approximately 10:00 PM and 4:00 AM, that the change in acceleration, orientation, altitude, or level of tilt of wearable computing device 10 remains at or below a minimum threshold change for indicating movement. Responsive to identifying a period of time, during two or more previous calendar days, during which wearable computing device 10 routinely experienced a minimal amount of change in acceleration, orientation, altitude, or level of tilt, prediction module 30 may infer that wearable computing device 10 will not be used on future calendar days between a corresponding period of time (e.g., between the hours of 10:00 PM and 4:00 AM). Prediction module 30 may store, at data store 32B, the period of time as a predicted, future period of time during which wearable computing device 10 will likely not be used.

Responsive to determining that wearable computing device 10 is not being used at a current time, UI module 20 of wearable computing device 10 may determine whether the current time coincides with at least one period of time from the one or more future periods of time. For example, UI module 20 may obtain an indication, via network 34, that a operating system or software package update is ready to be installed at wearable computing device 10. In order to prevent the installation of the operating system or software package update from inconveniencing a user, UI module 20 may defer the installation until a time when wearable computing device 10 is not being used.

At the current time, motion detection module 22 may observe a near constant acceleration, orientation, tilt, and/or altitude associated with wearable computing device 10. Motion detection module 22 may infer that wearable computing device 10 is not being used at the current time based on a determination that wearable computing device 10 has not detected movement associated with wearable computing device 10 for several minutes, seconds, etc. just prior to the current time. Motion detection module 22 may alert UI module 20 to the determination made that wearable computing device 10 is likely not being used at the current time.

Responsive to receiving the indication from motion detection module 22, UI module 20 may query prediction module 30 for a probability that wearable computing device 10 can complete the installation of the operating system or software package update, at the current time, and prior to the user resuming interacting with wearable computing device 10. Prediction module 30 may perform a look-up of the current time and determine that the current time coincides with (e.g., occurs during) one of the recurring periods of time stored at data store 32B. Prediction module 30 may determine that, because the recurring period of time will expire in approximately two hours from the current time and that the installation of the operating system or software package update is estimated to take only one hour, that a high probability (e.g., greater than fifty percent) exists that wearable computing device 10 can complete execution of the installation before the user of wearable computing device 10 resumes interacting with wearable computing device 10.

UI module 20 may receive from prediction module 30 an indication of the probability that wearable computing device 10 can complete execution of the installation in time. UI module 20 may determine whether the probability satisfies a probability threshold (e.g., fifty percent). Responsive to determining that the probability satisfies the probability threshold, UI module 20 may cause wearable computing device 10 to perform an operation. That is, UI module 20 may initiate execution of the operating system or software package update.

In this way, techniques of this disclosure may enable a wearable computing device to perform certain operations at times when the wearable computing device is not likely being used. By inferring when the wearable computing device is not going to be used, and predicting for how long, the wearable computing device can automatically perform operations at times that are least likely to interfere with user initiated operations. In other words, the wearable computing device wait to perform operations that prevent user access and user interaction until future times when the wearable computing device has sufficient time to complete the tasks without inconveniencing a user.

Although the example system 1 of FIG. 1 includes a mobile computing device and a remote computing system, the techniques of this disclosure could be performed entirely by a wearable computing device, such as wearable computing device 10. In some examples, the techniques may be performed mostly by a non-wearable computing device, such as mobile computing device 8 or remote computing system 6, that merely relies on motion sensor data obtained by a wearable computing device to make a determination about whether a wearable computing device is being used at a current time, and to predict the amount of time that the wearable computing device will go unused in order to perform an operation.

Throughout the disclosure, examples are described where a computing system (e.g., a server, etc.) and/or computing device (e.g., a wearable computing device, etc.) may analyze information (e.g., locations, speeds, accelerations, orientations, etc.) associated with the computing system and/or computing device, only if the computing system and/or computing device receives permission from a user (e.g., a person wearing a wearable computing device) to analyze the information. For example, in situations discussed below in which the mobile computing device may collect or may make use of information associated with the user and the computing system and/or computing device, the user may be provided with an opportunity to provide input to control whether programs or features of the computing system and/or computing device can collect and make use of user information (e.g., information about a user's e-mail, a user's social network, social actions or activities, profession, a user's preferences, or a user's past and current location), or to dictate whether and/or how to the computing system and/or computing device may receive content that may be relevant to the user. In addition, certain data may be treated in one or more ways before it is stored or used by the computing system and/or computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing system and/or computing device.

Figure 2:
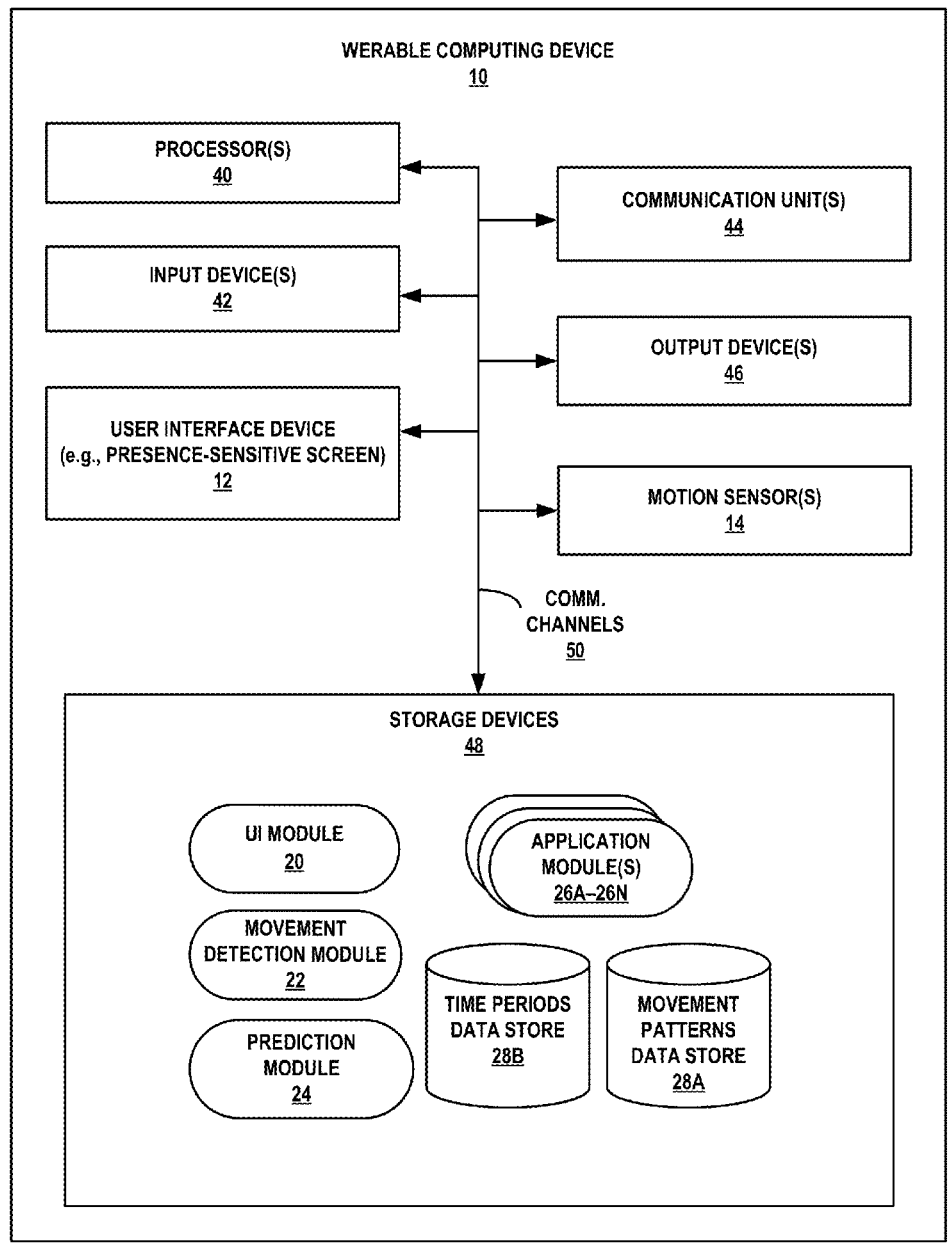
FIG. 2 is a block diagram illustrating an example wearable device configured to determine when a user will not be interacting with a wearable computing device, in accordance with one or more aspects of the present disclosure.

FIG. 2 is a block diagram illustrating an example wearable device configured to determine when a user will not be interacting with a wearable computing device, in accordance with one or more aspects of the present disclosure. Wearable computing device 10 of FIG. 2 is described below within the context of system 1 of FIG. 1. FIG. 2 illustrates only one particular example of wearable computing device 10 of system 1, and many other examples of wearable computing device 10 may be used in other instances and may include a subset of the components included in example wearable computing device 10 or may include additional components not shown in FIG. 2.

As shown in the example of FIG. 2, wearable computing device 10 includes user interface device 12 ("UID 12"), one or more motion sensors 14, one or more processors 40, one or more input devices 42, one or more communication units 44, one or more output devices 46, and one or more storage devices 48. Storage devices 48 of wearable computing device 10 also include UI module 20, movement detection module 22, prediction module 24, application modules 26A-

26N (collectively referred to as, "application modules 26"), and data stores 28A and 28B (collectively referred to as, "data stores 28").

Prediction module 24 may generally correspond to prediction module 30 of remote computing system 6 of system 1. Data stores 28A and 28B may correspond to, respectively, data stores 32A and 32B of remote computing system 6 of system 1. In other words, prediction module 24 of wearable computing device 10 may perform operations related to identifying and storing at data store 28B, indications of one or more future periods of time when wearable computing device 10 will not be used based on patterns of movement stored at data stores 28A.

Communication channels 50 may interconnect each of the components 12, 14, 20, 22, 24, 26, 28, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of wearable computing device 10 may receive input. Examples of input are tactile, audio, and video input. Input devices 42 of wearable computing device 10, in one example, includes a presence-sensitive display, touch-sensitive screen, mouse, keyboard, voice responsive system, video camera, microphone or any other type of device for detecting input from a human or machine.

One or more output devices 46 of wearable computing device 10 may generate output. Examples of output are tactile, audio, and video output. Output devices 46 of wearable computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of wearable computing device 10 may communicate with external devices (e.g., computing device 8, remote computing system 6, and the like) via one or more networks by transmitting and/or receiving network signals on the one or more networks. For example, wearable computing device 10 may use communication unit 44 to send and receive data to and from remote computing system 6 of FIG. 1. Wearable computing device 10 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 12 of wearable computing device 10 may include functionality of input devices 42 and/or output devices 46. In the example of FIG. 2, UID 12 may be or may include a presence-sensitive input device. In some examples, a presence sensitive input device may detect an object at and/or near a screen. In one example, a presence-sensitive input device of UID 12 may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. UI module 20 may cause UID 12 to present a graphical user interface. Said differently, UI module 20 may cause UID 12 to output a graphical user interface for display at a screen of a display device.

While illustrated as an internal component of wearable computing device 10, UID 12 also represents and external component that shares a data path with wearable computing device 10 for transmitting and/or receiving input and output. For instance, in one example, UID 12 represents a built-in component of wearable computing device 10 located within and physically connected to the external packaging of wearable computing device 10 (e.g., a screen on a mobile phone). In another example, UID 12 represents an external component of wearable computing device 10 located outside and physically separated from the packaging of wearable computing device 10 (e.g., a monitor, a projector, etc. that shares a wired and/or wireless data path with a tablet computer).

One or more storage devices 48 within wearable computing device 10 may store information for processing during operation of wearable computing device 10 (e.g., wearable computing device 10 may store data, for instance as movement patterns data store 28A and time periods data store 28B, accessed by modules 20, 22, 24, and 26 during execution at wearable computing device 10). In some examples, storage device 48 is a temporary memory, meaning that a primary purpose of storage device 48 is not long-term storage. Storage devices 48 on wearable computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 20, 22, 24, and 26 and data stores 28A and 28B.

One or more processors 40 may implement functionality and/or execute instructions within wearable computing device 10. For example, processors 40 on wearable computing device 10 may receive and execute instructions stored by storage devices 48 that execute the functionality of UI module 20, movement detection module 22, prediction module 24, and application modules 26. These instructions executed by processors 40 may cause wearable computing device 10 to store information, within storage devices 48 during program execution. Processors 40 may execute instructions of modules 20, 22, 24, and 26 to cause wearable computing device 10 to execute an operation when wearable computing device 10 is not being used, and when sufficient time exists to complete the operation before a user resumes using the device. For instance, processors 40 may execute instructions of modules 20, 22, 24, and 26 to install an operating system or software package update, deactivate UID 12, refrain from outputting at least one of audible type alerts, visual type alerts, or haptic feedback type alerts, or output, for display at UID 12, a security challenge graphical user interface.

Application modules 26 may include any type of application that computing device 2 may execute responsive to determining that wearable computing device 10 is not being used at a current time and further responsive to determining that the current time coincides with a future period of time during which wearable computing device 10 is predicted to not be used. Application modules 26 may be stand-alone applications or processes. In some examples, application modules 26 represent only a portion or some functionality of one or more other applications or systems. In some examples, applications modules 26 represent an operating system or computing platform of wearable computing device 26 for executing or controlling features and operations performed by other applications.

In accordance with techniques of this disclosure, wearable computing device 10 may predict, based on a plurality of movements detected by wearable computing device 10, one or more future periods of time during which wearable computing device 10 will not be used. For example, prediction module 24 may store motion sensor data obtained by motion detection module 22 at movement patterns data store 28A. A machine learning system of prediction module 24 may identify one or more recurring patterns in the motion sensor data that occur on multiple calendar days, between approximately the same times of day (e.g., within a time threshold of occurrence, such as one minute, one hour, several hours, etc.), and last for approximately the same duration of time (e.g., within a duration threshold such as one minute, one hour, several hours, etc.). Specifically, prediction module 24 may identify recurring patterns of movement that indicate durations of time during which wearable computing device did not move.

For example, prediction module 24 may identify a period of time on a first day when the acceleration of wearable computing device 10 does not change and infer that wearable computing device 10 was not being used during that time. Prediction module 24 may identify a corresponding period of time on a second, third, and fourth day, when the acceleration of wearable computing device 10 also does not change and may also infer that wearable computing device 10 was not being used during those times. Prediction module 24 may determine that since wearable computing device 10 was not being used at approximately the same time on each of the prior days that wearable computing device 10 will likely not be used in the future at those times. Prediction module 24 may store an indication (e.g., data) of the recurring, future period of time at data store 28B.

Responsive to determining that wearable computing device 10 is not being used at a current time, wearable computing device 10 may determine whether the current time coincides with at least one period of time from the one or more future periods of time. Responsive to determining that the current time coincides with the at least one period of time, wearable computing device 10 may perform an operation.

For example, application module 26A may output an alert to UI module 20 indicating that application module 26A needs to perform a system maintenance operation. Application module 26A may indicate to UI module 20 that the system maintenance operation takes approximately four hours. UI module 20 may defer the performance of the system maintenance operation until a time when UI module 20 determines that wearable computing device 10 is not being used.

At a later time, UI module 20 may receive an input from movement detection module 22 indicating that, at the current time, movements (or lack thereof) detected by motion sensors 14 indicate that wearable computing device 10 is not being used at the current time. UI module 20 may lookup the current time at data stores 28B to determine whether any of the stored periods of time coincide with the current time. UI module 20 may identify a period of time that coincides with the current time, however the duration of the period of time is less than two hours, therefore, UI module 20 may determine that the system maintenance operation cannot be performed by wearable computing device 10 in the period of time.

At yet a later time, UI module 20 may again receive an input from movement detection module 22 indicating that, at the current time, movements (or lack thereof) detected by motion sensors 14 indicate that wearable computing device 10 is not being used at the current time. UI module 20 may perform a query of the current time at data stores 28B to determine whether any of the stored periods of time coincide with the current time. UI module 20 may identify a longer period of time that coincides with the current time. The duration of the period of time is greater than four hours (e.g., the estimated duration of the system maintenance operation). UI module 20 may determine that the system maintenance operation can be performed by wearable computing device 10 in the period of time that coincides with the current time. UI module 20 may cause application module 26A to perform the system maintenance operation.

In some examples, UI module 20 may identify a plurality of operations to be performed by wearable computing device 10 at the current time. UI module 20 may select the operation(s) to be performed at the current time, in response to determining that each operation can be performed during the period of time. UI module 20 may not select those operations that cannot be performed during the period of time. In other words, if two or more operations are to be performed, UI module 20 may select and perform only those operations that are estimated to finish prior to the end of the recurring period.

In some examples, UI module 20 may cause wearable computing device 10 to perform operations that include installing a software package for subsequent execution at wearable computing device 10, or updating an operating system or computing platform executing at wearable computing device 10. For example, wearable computing device 10 may obtain periodic "updates" via network 34, to the software packages, operating system, and/or platform executing at wearable computing device 10. Rather than inconvenience a user and prevent him or her from interacting with wearable computing device 10 while the installation of an update occurs, wearable computing device 10 may perform the installation of an update at a time when wearable computing device 10 is likely not being used.

In some examples, UI module 20 may cause wearable computing device 10 to perform operations that include deactivating a display device associated with the wearable computing device (e.g., UID 12). For example, rather than necessarily rely on actual motion sensor data at a current time, wearable computing device can conserve electrical power and deactivate a display (or other components of wearable computing device) at times when wearable computing device 10 is likely not being used.

In some examples, UI module 20 may cause wearable computing device 10 to perform operations that include refraining from outputting at least one of audible type alerts, visual type alerts, or haptic feedback type alerts. For example, to prevent a user or other person, who is not interacting with wearable computing device 10 from being interrupted by audible, visual, or haptic feedback type alerts, wearable computing device 10 may disable alerts when wearable computing device 10 is likely not being used.

In some examples, UI module 20 may cause wearable computing device 10 to perform operations that include responsive to detecting future movement of wearable computing device 10, outputting, for display, a security challenge graphical user interface at UID 12. For example, if wearable computing device 10 predicts that a user will not be using wearable computing device 10 during a period of time, wearable computing device 10 may infer that any attempted use of wearable computing device 10 during that period of time could be unauthorized use. In other words, if an authorized user does not normally use wearable computing device 10 during a recurring period of time, then an attempted use of wearable computing device 10 during the recurring period of time could be malicious. Wearable computing device 10 may invoke an enhanced security protocol during that time, such as presenting a security challenge at wake-up.

Figure 3A:
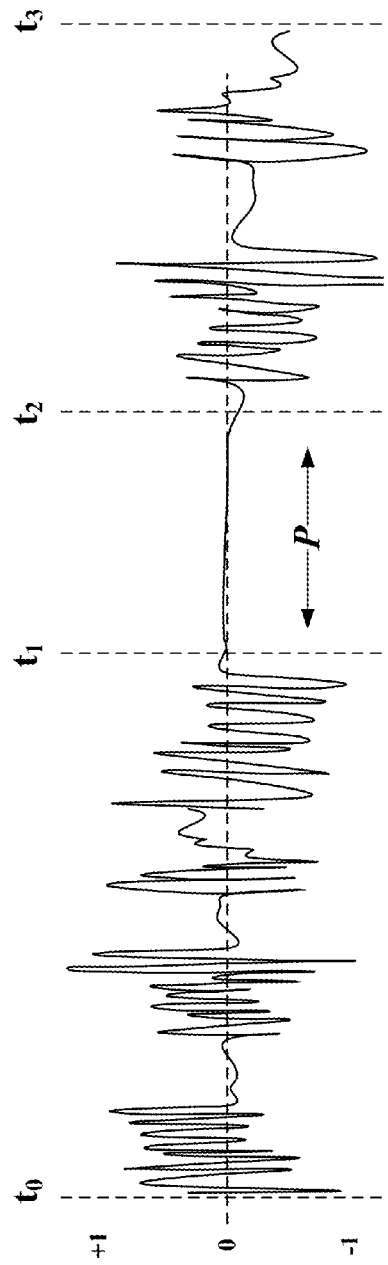
FIGS. 3A and 3B are conceptual timing diagrams illustrating example variations in indications of movement detected by a wearable computing device over a period of time, in accordance with one or more techniques of the present disclosure.
Figure 3B:
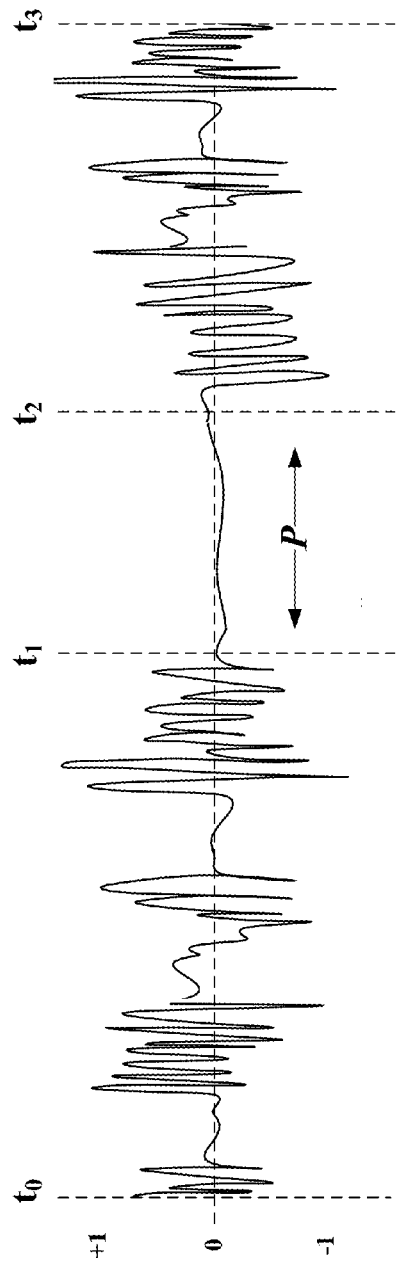

FIGS. 3A and 3B are conceptual timing diagrams illustrating example variations in indications of movement detected by a wearable computing device over a period of time, in accordance with one or more techniques of the present disclosure. FIGS. 3A and 3B are described below in the context of wearable computing device 10 of FIGS. 1 and 2 and remote computing system 6 of FIG. 1.

FIGS. 3A and 3B show a magnitude or a change in the magnitude, of a characteristic of movement associated with wearable computing device 10, between corresponding periods of time t0 and t3, on two different calendar days. For instance, FIG. 3A illustrates a normalized acceleration measurement taken by an accelerometer of motion sensors 14 on a first day between times t0 and t3. FIG. 3B illustrates the normalized acceleration measurement taken by the accelerometer of motion sensors 14 on a second day between the same times t0 and t3.

FIGS. 3A and 3B illustrate a recurring pattern of movement associated with wearable computing device 10 that occurs during period P, between times t1 and t2 on the first and second days. For example, the magnitude of the characteristic of movement associated with wearable computing device 10, appears to be similar (e.g., approximately zero) during period P, on both the first and second days.

In some examples, when predicting, the one or more future periods of time during which wearable computing device 10 will not be used prediction module 30 and/or 24 may identifying, based on the plurality of movements, a recurring period of time during which wearable computing device 10 did not move. Prediction module 30 and/or 24 may determine that at least one of the one or more future periods of time during which wearable computing device 10 will not be may correspond to the recurring period of time. Said differently, prediction module 30 and/or 24 may analyze the patterns of movement stored at data stores 32A and 28A respectively to identify one or more recurring patterns of movement, such as those shown during period P of FIGS. 3A and 3B.

In some examples, prediction modules 30 and/or 24 may identify the recurring period of time during which the wearable computing device did not move by at least determining, based on the plurality of movements that an acceleration of wearable computing device 10 does change during the recurring period of time. In some examples, prediction modules 30 and/or 24 may identify the recurring period of time during which the wearable computing device did not move by at least determining, based on the plurality of movements that a level of tilt or rotation of wearable computing device does not change during the recurring period of time. In other words, prediction modules 30 and/or 24 may not simply identify recurring patterns of movement during two or more calendar days. Rather prediction modules 30 and/or 24 may identify recurring patterns of "zero" movement that indicate wearable computing device 10 did not move. In this way, prediction modules 30 and/or 24 may determine future periods time when wearable computing device 10 will likely not move, and further, that the future periods are durations of time during which wearable computing device 10 will likely not be used.

In some examples, a machine learning or other artificial intelligent based system of prediction module 30 remote computing system 6 may identify a recurring period of time (e.g., periods P of FIGS. 3A and 3B) that prediction module 30 stores at data store 32B indicating when wearable computing device 10 did not move by at least performing the following series of operations. Prediction module 30 may determine, based on the one or more detected movements, a respective first time on at least two of a plurality of prior days when wearable computing device 10 was last used (e.g., time t1 of FIGS. 3A and 3B). Prediction module 30 may determine, based on the one or more detected movements, a respective second time on the at least two of the plurality of prior days when wearable computing device 10 was used subsequent to the first time (e.g., time t2 of FIGS. 3A and 3B). Lastly, prediction module 30 may determine, based on the respective first time and the respective second time of each of the at least two of the plurality of prior days, the recurring period of time (e.g., periods P of FIGS. 3A and 3B). The recurring period of time may correspond to a respective period of time of each of the at least two of the plurality of prior days between the respective first time and the respective second time of each of the at least two of the plurality of prior days.

In some examples, wearable computing device 10 may perform the operation in responsive to determining that the operation can be performed before termination of the at least one period of time. For example, prediction module 24 of wearable computing device 10 may determine that a predicted future period of time has a sufficiently long enough duration to complete operation of a queued-up operation before termination of the predicted future period of time. In other words, wearable computing device 10 may first determine whether a current time coincides with a future period of time during which wearable computing device 10 will not be used, and second, may determine whether an operation can be completed during the future period of time, before termination of the future period of time.

In some examples, prediction module 24 may determine a recurring period of time by identifying a recurring period of time, based on the movements, during which a frequency of movement associated with the movement satisfies a frequency threshold for indicating that the wearable computing device is not being used. The one or more future periods of time correspond to the recurring period of time. In other words, prediction module 24 may identify a period of time, P, during which a frequency of movement associated with an acceleration, a rotation, a tilt, etc. is less than a frequency threshold represents a frequency of movement typically detected when a person is sleeping, resting, or not wearing wearable computing device 10. In this way, wearable computing device 10 can determine that wearable computing device 10 is not being used, even during periods of sleep during which wearable computing device 10 may move slightly, as wearable computing device 10 is being worn by a user who is sleeping.

In some examples, prediction module 24 may determine a recurring period of time by identifying a recurring period of time, based on the movements, during which a magnitude of change associated with the movement satisfies a threshold for indicating that the wearable computing device is not being used. The one or more future periods of time correspond to the recurring period of time. In other words, prediction module 24 may identify a period of time, P, during which a magnitude of change associated with an acceleration, a rotation, a tilt, etc. is less than a magnitude of change threshold which represents a magnitude of change typically detected when a person is sleeping, resting, or not wearing wearable computing device 10. In this way, wearable computing device 10 can determine that wearable computing device 10 is not being used, even during periods of sleep during which wearable computing device 10 may move slightly, as wearable computing device 10 is being worn by a user who is sleeping.

Figure 4:
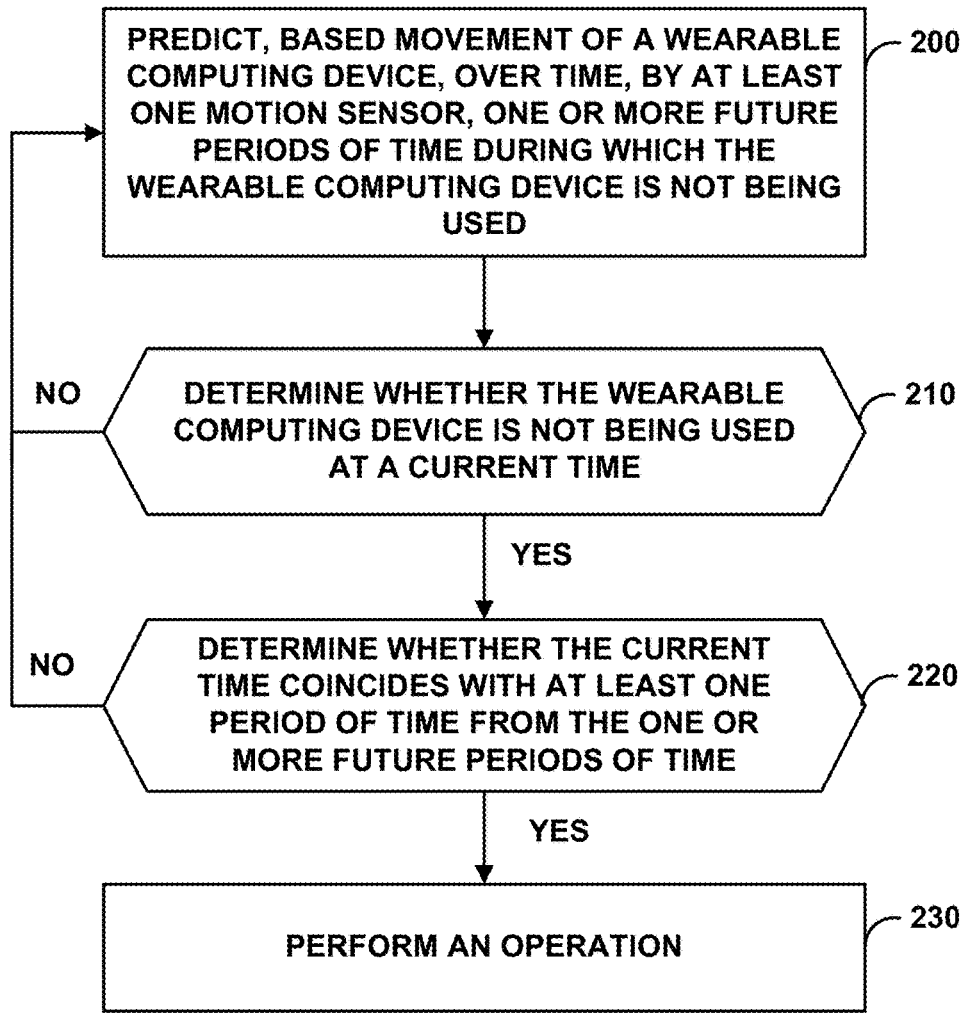
FIG. 4 is a flowchart illustrating example operations of an example wearable computing device configured to determine when a user will not be interacting with the wearable computing device, in accordance with one or more aspects of the present disclosure.

FIG. 4 is a flowchart illustrating example operations of an example wearable computing device configured to determine when a user will not be interacting with the wearable computing device, in accordance with one or more aspects of the present disclosure. The process shown in FIG. 4 may be performed by one or more processors of a computing device, such as wearable computing devices 10 and 100 illustrated in FIG. 1, FIG. 2, and FIG. 3. For purposes of illustration, FIG. 4 is described below within the context of computing system 1 of FIG. 1.

Wearable computing device 10 may predict, based on movement of the wearable computing device detected, over time, one or more future periods of time during which wearable computing device will not be used (200). For example, prediction module 24 may obtain sensor data captured by one or more motion sensors 14 and generate a database, stored at data store 28A, of detected movements associated with wearable computing device 10 detected over time. Prediction module 24 may analyze the sensor data stored at data store 28A to identify one or more recurring periods of time during which wearable computing device 10 did not move. Prediction module 24 may mark and associate each identified period of time with an entry at data store 28B. From data store 28B, prediction module 24 can perform a look-up of a current time, to determine whether the current time coincides with any of the previously identified periods of time that prediction module 24 infers wearable computing device 10 will not be used.

Wearable computing device 10 may determine whether wearable computing device 10 is not being used at a current time (210). For example, at a current time, UI module 20 may identify an operation to be performed by wearable computing device 10 as soon as possible. UI module 20 may determine that the operation may require substantial resources of wearable computing device 10, or require a substantial amount of time, hence, UI module 20 may determine that the operation is to be performed when wearable computing device 10 is not being used.

UI module 20 may query movement detection module 22 for an indication of whether wearable computing device 10 is being used at the current time. If movement detection module 22 responds with information indicating that wearable computing device 10 is being used at the current time, UI module 20 may defer performing the operation until a later time.

Otherwise, responsive to determining that the wearable computing device is not being used at a current time, wearable computing device 10 may determining whether the current time coincides with at least one period of time from the one or more future periods of time (220). For example, UI module 20 may query prediction module 24 for an indication of whether the current time coincides with a predicted period of time stored at data store 28B. By determining whether the current time coincides with a predicted period of time, UI module 20 can improve a likelihood that execution of the operation will not inconvenience a user that wishes to interact with wearable computing device 10 in the near future, even though he or she may not be using wearable computing device 10 at the current time.

Responsive to determining that the current time coincides with the at least one period of time, wearable computing device 10 may perform an operation (230). For example, prediction module 24 may provide information indicating that the current time coincides with a future period of time, along with a duration of the period of time. UI module 20 may determine whether the duration of the period of time is sufficient to allow wearable computing device 10 to complete execution of the operation. In response to determining that the operation can be performed within the duration of the period of time, UI module 20 may cause wearable computing device 10 to perform the operation.

Figure 5:
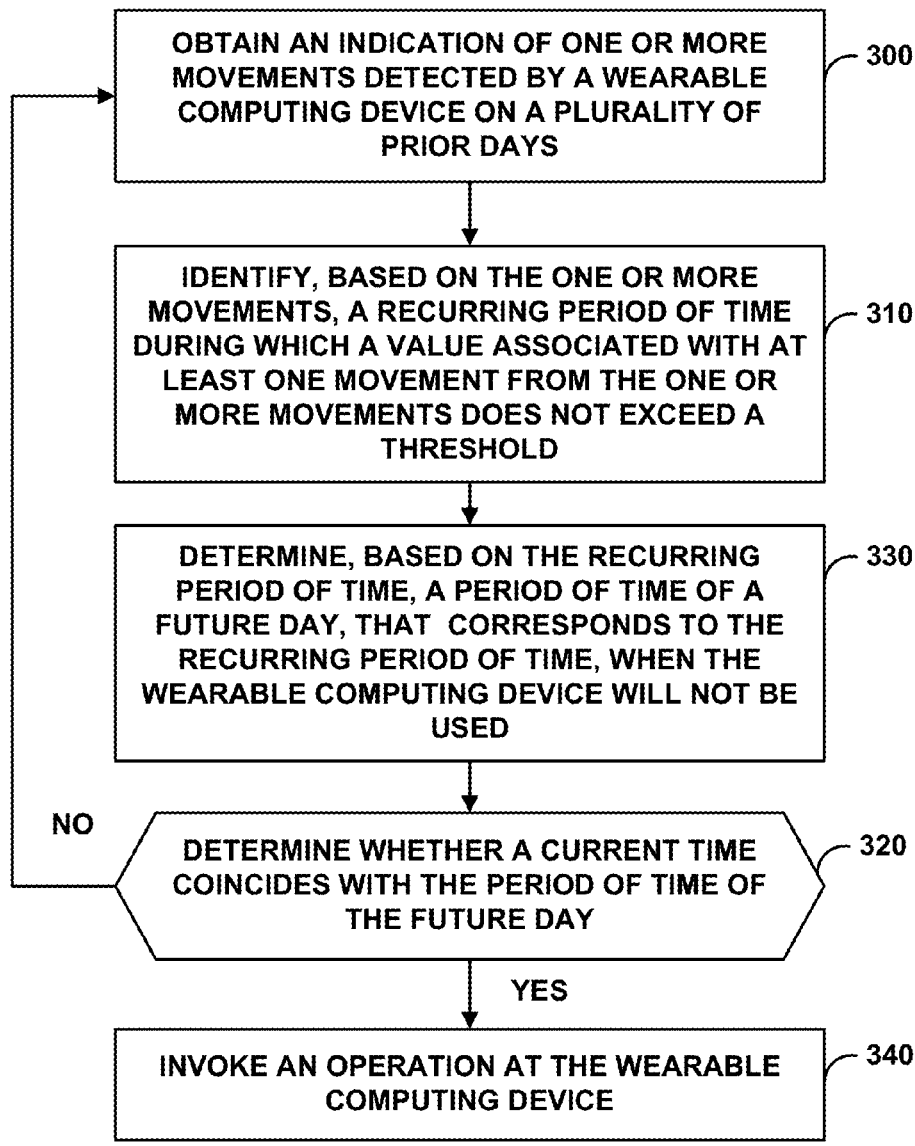
FIG. 5 is a flowchart illustrating example operations of an example computing system configured to determine when a user will not be interacting with a wearable computing device, in accordance with one or more aspects of the present disclosure.

FIG. 5 is a flowchart illustrating example operations of an example computing system configured to determine when a user will not be interacting with a wearable computing device, in accordance with one or more aspects of the present disclosure. The process shown in FIG. 5 may be performed by one or more processors of a computing system, such as remote computing system 6 illustrated in FIG. 1, or one or more processors of a mobile computing device, such as mobile computing device 8 of FIG. 1. For purposes of illustration, FIG. 5 is described below within the context of remote computing system 6 of FIG. 1.

Remote computing system 6 may obtain an indication of one or more movements detected by a wearable computing device on a plurality of prior days (300). For example, prediction module 30 of remote computing system 6 may receive motion sensor data from wearable computing device 10 and store the motion sensor data at data store 32A.

Remote computing system 6 may identify, based on the one or more movements, a recurring period of time during which a value associated with at least one movement from the one or more movements does not exceed a threshold (310). For example, a machine learning system of prediction module 30 may analyze the motion data stored at data store 32A and identify one or more recurring movement patterns that indicate prolonged recurring period of time during which almost no, or minimal, movement associated with wearable computing device 10 occurred. For instance, prediction module 30 may identify a several hour period, between the same times of day on multiple calendar days, during which wearable computing device 10 maintained a zero change in tilt, rotation, acceleration, etc. and/or the change in tilt, rotation, acceleration does not exceed a minimum threshold typically exceeded when a user is awake and wearing wearable computing device 10. Prediction module 30 may identify such several hour period as a period during which the user is likely sleeping or otherwise indicates a recurring period of time when wearable computing device 10 did not move.

Remote computing system 6 may determine, based on the recurring period of time, a period of time of a future day that corresponds to the recurring period of time when wearable computing device 10 will not be used. The period of time of the future day corresponds to the recurring period of time of the plurality of days (320). For example, prediction module 30 of remote computing system 6 may identify a recurring pattern of little to no movement (or changes in movement) associated with wearable computing device 10 that occurs at approximately the same time, on multiple days. Prediction module 30 may store an indication of the recurring period of time at data stores 32B. For example, prediction module 30 may maintain a calendar based database at data store 32 and may mark each day of the calendar with an indication of the one or more recurring periods of time during which wearable computing device 10 does not move, and therefore, will likely not be used.

Responsive to determining that a current time coincides with the period of time of the future day (330), remote computing system 6 may invoke, at wearable computing device 10, an operation (340). For example, remote computing system 6 may periodically push software updates, notifications, alerts, etc. to wearable computing device 10. Rather than indiscriminately push, and potentially cause wearable computing device 10 to perform, an installation of a software update or perform some other resource intensive operation, prediction module 30 of remote computing system 6 may postpone invoking wearable computing device 10 to perform an operation until a future time when prediction module 30 determines that wearable computing device 10 will have a sufficient amount of time to perform the operation without inconveniencing a user. At the current time, remote computing system 6 may issue a command to UI module 20 that causes UI module 20 to invoke the operation.

In some examples, the operation being invoked by remote computing device 6 may be an operation performed by wearable computing device 10 for deactivating a display device of wearable computing device 10 (e.g., UID 12), installing a software package for subsequent execution at one or more processors 40 of wearable computing device 10, or updating an operating system or computing platform executing at wearable computing device 10. In some examples, the operation being invoked by remote computing device 6 may be an operation performed by wearable computing device 10 for refraining from outputting (e.g., at UID 12 and/or one or more output devices 46) at least one of audible type alerts, visual type alerts, or haptic feedback type alerts, or outputting, for display at the display device (e.g., UID 12), a security challenge graphical user interface.

Clause 1. A method comprising: predicting, based on movement of a wearable computing device over time, one or more future periods of time during which the wearable computing device will not be used; responsive to determining that the wearable computing device is not being used at a current time, determining whether the current time coincides with at least one period of time from the one or more future periods of time; and responsive to determining that the current time coincides with the at least one period of time, performing, by the wearable computing device, an operation.

Clause 2. The method of clause 1, wherein the operation is performed responsive to determining that the operation can be performed before termination of the at least one period of time.

Clause 3. The method of clause 2, further comprising: identifying a plurality of operations to be performed by the wearable computing device at the current time, wherein the operation is one of the plurality of operations; and responsive to determining that the operation can be performed before the termination of the at least one period of time, selecting the operation from the plurality of operations, wherein the operation is performed in response to the selection.

Clause 4. The method of any of clauses 1-3, wherein predicting the one or more future periods of time during which the wearable computing device will not be used comprises: determining, based on the movement, a recurring period of time during which a frequency of movement associated with at least one movement from the movement satisfies a frequency threshold for indicating that the wearable computing device is not being used, wherein at least one of the one or more future periods of time corresponds to the recurring period of time.

Clause 5. The method of any of clauses 1-4, wherein predicting the one or more future periods of time during which the wearable computing device will not be used comprises: determining, based on the movement, a recurring period of time during which a magnitude of change associated with the movement satisfies a frequency threshold for indicating that the wearable computing device is not being worn or that a user of the wearable computing device is sleeping, wherein at least one of the one or more future periods of time corresponds to the recurring period of time.

Clause 6. The method of any of clauses 1-5, wherein the movement comprises at least one of an acceleration of wearable computing device, a level of tilt of wearable computing device, or a rotation of wearable computing device.

Clause 7. The method of any of clauses 1-6, wherein performing the operation comprises at least one of: installing a software package for subsequent execution at the wearable computing device, or updating an operating system or computing platform executing at the wearable computing device.

Clause 8. The method of any of clauses 1-7, wherein performing the operation comprises deactivating, by the wearable computing device, a display device associated with the wearable computing device.

Clause 9. The method of any of clauses 1-8, wherein performing the operation comprises refraining from outputting, by the wearable computing device, at least one of audible type alerts, visual type alerts, or haptic feedback type alerts.

Clause 10. The method of any of clauses 1-9, wherein performing the operation comprises: responsive to detecting future movement of the wearable computing device, outputting, by the wearable computing device, for display, a security challenge graphical user interface.

Clause 11. A wearable computing device comprising: at least one motion sensor; at least one module; and at least one processor operable by the at least one processor to: predict, based on movement, over time, detected by the at least one motion sensor, one or more future periods of time during which the wearable computing device will not be used; responsive to determining that the wearable computing device is not being used at a current time, determine whether the current time coincides with at least one period of time from the one or more future periods of time; and responsive to determining that the current time coincides with the at least one period of time, perform an operation.

Clause 12. The wearable computing device of clause 11, wherein the at least one module is further operable by the at least one processor to perform the operation in response to determining that the operation can be performed before termination of the at least one period of time.

Clause 13. The wearable computing device of clause 12, wherein the at least one module is further operable by the at least one processor to: identify a plurality of operations to be performed by the wearable computing device at the current time, wherein the operation is one of the plurality of operations; and responsive to determining that the operation can be performed during the at least one period of time, select the operation from the plurality of operations, wherein the operation is performed in response to the selection.

Clause 14. The wearable computing device of any of clauses 11-13, wherein the at least one module is further operable by the at least one processor to predict the one or more future periods of time during which the wearable computing device will not be used by at least: determining, based on the movement, a recurring period of time during which a frequency of movement associated with the movement satisfies a frequency threshold for indicating that the wearable computing device is not being used, wherein at least one of the one or more future periods of time corresponds to the recurring period of time.

Clause 15. The wearable computing device of any of clauses 11-14, wherein the at least one module is further operable by the at least one processor to predict the one or more future periods of time during which the wearable computing device will not be used by at least: determining, based on the movement, a recurring period of time during which a magnitude of change associated with at least one movement from the movement satisfies a frequency threshold for indicating that the wearable computing device is not being worn or that a user of the wearable computing device is sleeping, wherein at least one of the one or more future periods of time corresponds to the recurring period of time.

Clause 16. The wearable computing device of any of clauses 11-15, wherein the at least one module is further operable by the at least one processor to perform the operation by at least: installing a software package for subsequent execution at the wearable computing device; updating an operating system or computing platform executing at the wearable computing device; deactivating a display device; refraining from outputting at least one of audible type alerts, visual type alerts, or haptic feedback type alerts; or responsive to detecting future movement of the wearable computing device, outputting, for display, a security challenge graphical user interface.

Clause 17. A method comprising: obtaining, by a computing system, an indication of one or more movements detected by a wearable computing device on a plurality of prior days; identifying, by the computing system, based on the one or more movements, a recurring period of time during which a frequency of movement or a magnitude of change associated with at least one movement from the one or more movements satisfies a threshold for indicating that the wearable computing device is not being used; determining, by the computing system, based on the recurring period of time, a period of time of a future day when the wearable computing device will not be used, wherein the period of time of the future day corresponds to the recurring period of time of the plurality of days; and responsive to determining that a current time coincides with the period of time of the future day, invoking, by the computing system, at the wearable computing device, an operation.

Clause 18. The method of clause 17, wherein identifying the recurring period of time when the wearable computing device did not move comprises: determining, by the computing system, based on the one or more detected movements, a respective first time on at least two of the plurality of prior days when the wearable computing device was last used; determining, by the computing system, based on the one or more detected movements, a respective second time on the at least two of the plurality of prior days when the wearable computing device was used subsequent to the first time; and determining, by the computing system, based on the respective first time and the respective second time of each of the at least two of the plurality of prior days, the recurring period of time, wherein the recurring period of time corresponds to a respective period of time of each of the at least two of the plurality of prior days between the respective first time and the respective second time of each of the at least two of the plurality of prior days.

Clause 19. The method of any of clauses 17-18, wherein the computing system is a mobile computing device.

Clause 20. The method of any of clauses 17-19, wherein the operation comprises at least one of: deactivating a display device of the wearable computing device; installing a software package for subsequent execution at the wearable computing device; updating an operating system or computing platform executing at the wearable computing device; refraining from outputting at least one of audible type alerts, visual type alerts, or haptic feedback type alerts; or outputting, for display at the display device, a security challenge graphical user interface.

Clause 21. A computer readable storage medium comprising instructions, that when executed, configure one or more processors of a computing device to perform any of the methods of clauses 1-10.

Clause 22. A computer readable storage medium comprising instructions, that when executed, configure one or more processors of a computing system to perform any of the methods of clauses 16-20.

Clause 23. A wearable computing device comprising means for performing any of the methods of clauses 1-10.

Clause 24. A computing device comprising means for performing any of the methods of clauses 1-10.

Clause 24. A computing system comprising means for performing any of the methods of clauses 1-10 and 17-20.

In each of the various examples described above, computing devices, mobile computing devices, wearable computing devices, computing systems, and other computing devices may analyze information (e.g., locations, speeds, etc.) associated with the wearable computing devices, computing systems, and other computing devices, only if the wearable computing devices, computing systems, and other computing devices, receive permission from a user of such wearable computing devices, computing systems, and other computing devices, to analyze the information. For example, in situations discussed below in which a wearable computing device or computing system may collect or may make use of information associated with a user and the wearable computing device and computing system, the user may be provided with an opportunity to control whether programs or features of the wearable computing device and computing system can collect and make use of user information (e.g., information about a user's location, speed, mode of transportation, e-mail, a user's social network, social actions or activities, profession, a user's preferences, or a user's past and current location), or to control whether and/or how to the wearable computing device and computing system receive content that may be relevant to the user. In addition, certain data may be treated in one or more ways before it is stored or used by the wearable computing device and computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the wearable computing device and computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, based on a movement of a wearable computing device being detected during multiple days of a sample period, a recurring period of time of day during which a frequency or a magnitude of the movement satisfies a threshold that indicates the wearable computing device was not being used;
   determining, at a time after the sample period and by the wearable computing device, whether a current period of time of day, coincides with the recurring period of time of day; and
   responsive to determining that the current period of time of day coincides with the recurring period of time of day and responsive to determining that an operation can be completed during the recurring period of time of day, performing, by the wearable computing device, the operation during the current period of time of day.

2. The method of claim 1, wherein a machine learning system of the wearable computing device determines the recurring period of time of day when the wearable computing device is not being used.

3. The method of claim 2, further comprising:
   receiving, from at least one sensor of the wearable computing device, first movement data indicating a lack of movement of the wearable computing device being detected during a first period of time of a first day of the multiple days of the sample period;
   receiving, from at least one sensor of the wearable computing device, second movement data indicating a lack of movement of the wearable computing device being detected during a second period of time of a second day of the multiple days of the sample period, the second day being different than the first day, wherein the second period of time of the second day corresponds to the first period of time of the first day;
   identifying, by the machine learning system, based on the first movement data and the second movement data, the first period of time of the first day and the second period of time of the second day as being the recurring period of time of day when the wearable computing device is not being used; and
   generating, by the machine learning system, a rule that predicts the current period of time of day to be when the wearable computing device will not be used.

4. The method of claim 3, wherein the machine learning system of the wearable computing device determines, using the rule, whether the current period of time of day coincides with the recurring period of time of day.

5. The method of claim 3, further comprising:
determining, by the machine learning system, based on the first movement data and the second movement data, one or more changes in a frequency or a magnitude of acceleration of wearable computing device during the first period of time of the first day and during the second period of time of the second day; and
responsive to determining that the one or more changes in the frequency or the magnitude of acceleration of wearable computing device during the first period of time of the first day and during the second period of time of the second day satisfy a threshold, identifying, by the machine learning system, the first period of time of the first day and the second period of time of the second day as coinciding with the recurring period of time of day when the wearable computing device is not being used.

6. The method of claim 1, wherein determining the recurring period of time of day when the wearable computing device is not being used comprises determining the recurring period of time of day when the wearable computing device is not being worn.

7. The method of claim 1, wherein performing the operation comprises outputting, for display, a security challenge graphical user interface in response to detecting future movement of the wearable computing device during the recurring period of time of day.

8. A wearable computing device comprising:
at least one sensor configured to detect movement associated with the computing device;
at least one processor;
a memory comprising instructions that, when executed, cause the at least one processor to:
determine, based on a movement of detected by the at least one sensor during multiples days of a sample period, a recurring period of time of day during which a frequency or a magnitude of the movement satisfies a threshold that indicates the wearable computing device is not being used;
determine, at a time after the sample period, whether a current period of time of day coincides with the recurring period of time of day; and
responsive to determining that the current period of time of day coincides with the recurring period of time of day and responsive to determining that an operation can be completed during the recurring period of time of day, perform the operation during the current period of time of day.

9. The wearable computing device of claim 8, wherein the instructions, when executed, cause the at least one processor to execute a machine learning system to determine the recurring period of time of day when the wearable computing device is not being used.

10. The wearable computing device of claim 9, wherein the instructions, when executed, further cause the at least one processor to execute the machine learning system to:
receive, from the at least one sensor, first movement data indicating a lack of movement of the wearable computing device being detected during a first period of time of a first day from the multiple days of the sample period;
receive, from the at least one sensor, second movement data indicating a lack of movement of the wearable computing device being detected during a second period of time of a second day from the multiple days of the sample period, the second day being different than the first day, wherein the second period of time of the second day corresponds to the first period of time of the first day;
identify, based on the first movement data and the second movement data, the first period of time of the first day and the second period of time of the second day as coinciding with the recurring period of time of day when the wearable computing device is not being used; and
generate a rule that predicts the current period of time of day to be when the wearable computing device will not be used.

11. The wearable computing device of claim 10, wherein the instructions, when executed, further cause the at least one processor to execute the machine learning system to determine, using the rule, whether the current period of time of day coincides with the recurring period of time of day.

12. The wearable computing device of claim 10, wherein the instructions, when executed, further cause the at least one processor to execute the machine learning system to:
determine, based on the first movement data and the second movement data, one or more changes in a frequency or a magnitude of acceleration of wearable computing device during the first period of time of the first day and during the second period of time of the second day; and
responsive to determining that the one or more changes in the frequency or the magnitude of acceleration of wearable computing device during the first period of time of the first day and during the second period of time of the second day satisfy a threshold, identify the first period of time of the first day and the second period of time of the second day as coinciding with the recurring period of time of day when the wearable computing device is not being used.

13. The wearable computing device of claim 8, wherein the instructions, when executed, cause the at least one processor to determine the recurring period of time of day when the wearable computing device is not being used by determining the recurring period of time of day when the wearable computing device is not being worn.

14. The wearable computing device of claim 8, further comprising a display, wherein the instructions, when executed, cause the at least one processor to perform the operation by outputting, at the display, a security challenge graphical user interface in response to detecting future movement of the wearable computing device during the recurring period of time of day.

15. A non-transitory computer-readable storage medium comprising instructions that, when executed, cause at least one processor of a wearable computing device to:
determine, based on a movement of the wearable computing device detected during multiples days of a sample period, a recurring period of time of day during which a frequency or a magnitude of the movement satisfies a threshold that indicates the wearable computing device is not being used;
determine, at a time after the sample period, whether a current period of time of day coincides with the recurring period of time of day; and
responsive to determining that the current period of time of day coincides with the recurring period of time of day and responsive to determining that an operation can be completed during the recurring period of time of day, perform the operation during the current period of time of day.

16. The non-transitory computer-readable storage medium of claim 15, wherein the instructions, when executed, cause the at least one processor to execute a machine learning system to determine the recurring period of time of day when the wearable computing device is not being used.

17. The non-transitory computer-readable storage medium of claim 16, wherein the instructions, when executed, further cause the at least one processor to execute the machine learning system to:
- receive first movement data indicating a lack of movement of the wearable computing device being detected during a first period of time of a first day from the multiple days of the sample period;
- receive second movement data indicating a lack of movement of the wearable computing device being detected during a second period of time of a second day from the multiple days of the sample period, the second day being different than the first day, wherein the second period of time of the second day corresponds to the first period of time of the first day;
- identify, based on the first movement data and the second movement data, the first period of time of the first day and the second period of time of the second day as coinciding with the recurring period of time of day when the wearable computing device is not being used; and
- generate a rule that predicts the current period of time of day to be when the wearable computing device will not be used.

18. The non-transitory computer-readable storage medium of claim 17, wherein the instructions, when executed, further cause the at least one processor to execute the machine learning system to determine, using the rule, whether the current period of time of day coincides with the recurring period of time of day.

19. The non transitory computer-readable storage medium of claim 15, wherein the instructions, when executed, cause the at least one processor to determine the recurring period of time of day when the wearable computing device is not being used by determining the recurring period of time of day when the wearable computing device is not being worn.

20. The non transitory computer-readable storage medium of claim 15, wherein the instructions, when executed, cause the at least one processor to perform the operation by outputting, at a display, a security challenge graphical user interface in response to detecting future movement of the wearable computing device during the recurring period of time of day.

* * * * *

UNITED STATES PATENT AND TRADEMARK OFFICE
CERTIFICATE OF CORRECTION

PATENT NO. : 9,864,955 B2
APPLICATION NO. : 15/437130
DATED : January 9, 2018
INVENTOR(S) : Alexander Faaborg and Jeffrey Albert Chang Page 1 of 1

It is certified that error appears in the above-identified patent and that said Letters Patent is hereby corrected as shown below:

In the Claims

Column 27, Line 36 (Claim 8): "movement of detected" should read --movement detected--

Column 27, Line 37 (Claim 8): "during multiples days" should read --during multiple days--

Column 28, Line 54 (Claim 15): "during multiples days" should read --during multiple days--

Column 30, Line 13 (Claim 19): "non transitory" should read --non-transitory--

Column 30, Line 18 (Claim 20): "non transitory" should read --non-transitory--

Signed and Sealed this
Eighth Day of May, 2018

Andrei Iancu
*Director of the United States Patent and Trademark Office*